May 15, 1962 W. F. WALKER ETAL 3,035,184

LINEAR DELAY DEVICE

Filed Aug. 25, 1958 3 Sheets-Sheet 1

INVENTOR.
CHARLES H. REYNOLDS
BY WATSON F. WALKER

ATTORNEY

May 15, 1962 W. F. WALKER ETAL 3,035,184

LINEAR DELAY DEVICE

Filed Aug. 25, 1958 3 Sheets-Sheet 2

INVENTOR.
CHARLES H. REYNOLDS
BY WATSON F. WALKER
F. L. Slyner
ATTORNEY

May 15, 1962 W. F. WALKER ETAL 3,035,184

LINEAR DELAY DEVICE

Filed Aug. 25, 1958 3 Sheets-Sheet 3

INVENTOR.
CHARLES H. REYNOLDS
BY WATSON F. WALKER
T. L. Styner
ATTORNEY

United States Patent Office 3,035,184

Patented May 15, 1962

3,035,184

LINEAR DELAY DEVICE

Watson F. Walker and Charles H. Reynolds, Rochester, N.Y., assignors to General Dynamics Corporation, Rochester, N.Y., a corporation of Delaware Filed Aug. 25, 1958, Ser. No. 756,996
6 Claims. (Cl. 307—88.5)

This invention relates to adjustable delay circuits and is particularly directed to means for producing a pulse at an accurately predetermined and adjustable time after an initiating pulse.

Delay circuits are becoming more and more important in pulse techniques. In navigation radios, digital computers, counters, pulse modulated carriers, and the like it is increasingly necessary to not only produce pulse delays of microseconds, milliseconds, or even seconds, but to easily adjust the duration of the delay periods.

The principal object of this invention is to provide an improved circuit which will produce an electric pulse an accurately adjustable period of time after the instant of an initiating pulse.

The object of this invention is attained by connecting a source of linear changing voltage to a storage condenser. The condenser is normally held in discharged condition by a clamping circuit which clamping circuit can be relieved, or disabled, by a regenerative amplifier circuit in response to an initiating pulse. The voltage source and the connected terminal of the condenser is held at a reference level, or ground, until the instant of the initiating pulse. When the voltage of the now linearly charging condenser reaches a predetermined level, at a predetermined time after the initiating pulse, the rising voltage is arrested by a second and adjustable clamping circuit whereupon the cessation of charging current triggers the regenerative amplifier, reestablishes the first clamping circuit, and sharply discharges the storage condenser. The discharge current may be differentiated to produce a pulse voltage. The adjustable clamping circuit, accordingly, in cooperation with the linear voltage ramp, effectively adjusts the time interval between the beginning of condenser charge, marked by the initiating pulse, and the termination of the condenser charge marked by the differentiated pulse. The initiating and terminating pulses occur at the beginning and trailing edge of a square wave which wave is adjustable in duration and has many uses.

Other objects and features of this invention will become apparent to those skilled in the art by referring to the embodiments described in the following specification and shown in the accompanying drawing, in which.

Figure 1:
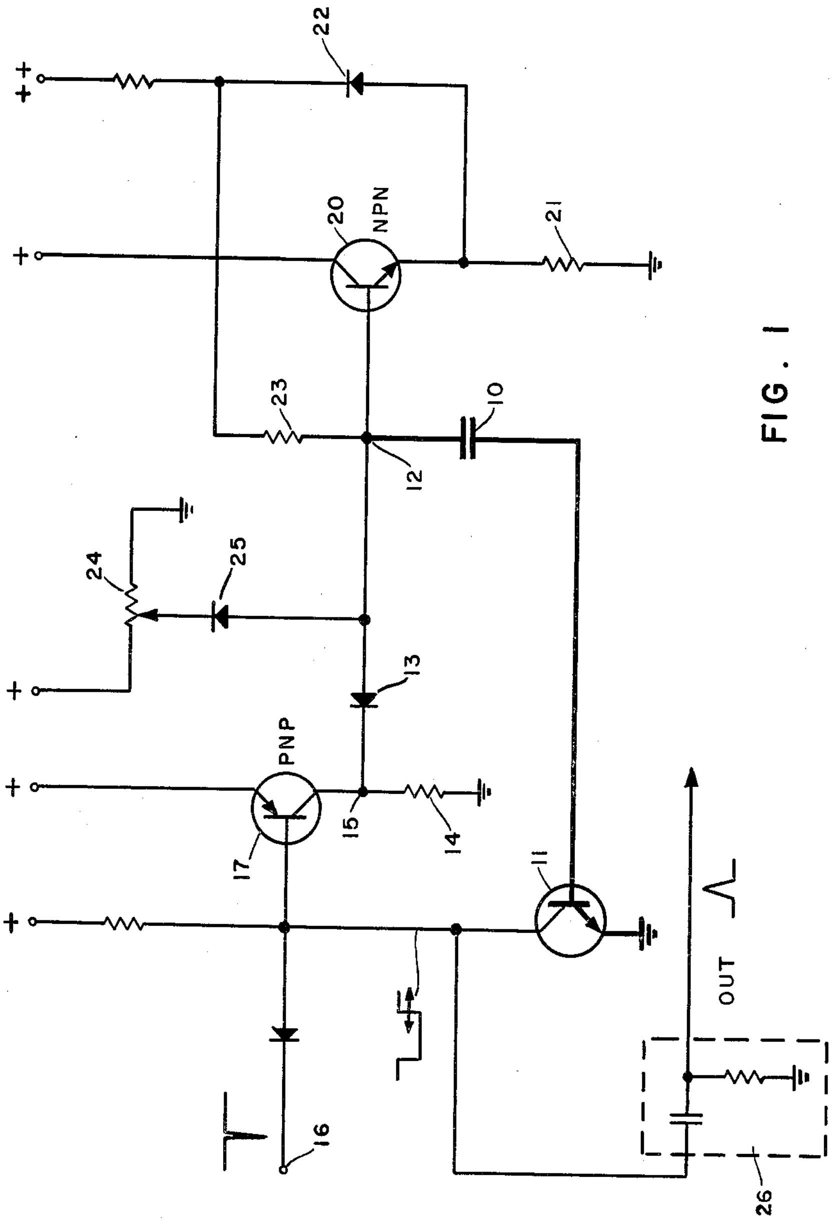
FIG. 1 is a circuit diagram, somewhat simplified, of one embodiment of this invention.

In FIG. 1, condenser 10 is a storage condenser, the electric charge of which plays an important role in the time delay circuit of this invention. One terminal of the condenser is connected to ground or other point of reference potential through two electrodes of transistor 11. The low interelectrode resistance of the transistor is recognized and is importantly employed in the circuit of this invention. The base-to-emitter resistance of transistor 11, which in the embodiment shown is of the N-P-N type, may be of the order of 100 ohms so that the connected terminal of the condenser 10 is effectively grounded. Further, the collector potential and current of transistor 11 is a function of the base-to-emitter current. The other terminal 12 of condenser 10 is connected to two independent circuits: one for charging the condenser and the other for discharging the condenser.

The discharging circuit for condenser 10 comprises the clamping and holding diode 13 connected to ground through resistor 14, the diode being so polarized that a zero potential at the upper end of resistor 14 permits forward conduction from right to left through the diode and effectively short circuits the condenser 10 through the low resistance of 14 and through the low resistance of the emitter-base of 11. As will more fully hereinafter be described, condenser 10 stands short-circuited and normally without charge, because of the clamping action of 11—13—14, until the arrival of a time-marking pulse.

The clamping action of diode 13 is relieved, or disabled, by moving point 15, connected to the cathode-electrode of the diode, to some elevated positive potential. According to an important feature of this invention, the elevation of potential at point 15 is effected by an amplifier which responds to the initiating pulse at input terminal 16 and to the potential of the output electrode of transistor 11. The output electrode of transistor 11 in FIG. 1 is the collector. The clamp controlling amplifier 17 is preferably a transistor and, in the example shown, is of the P-N-P type with the emitter held at a positive potential and the emitter-collector circuit in series with resistor 14. A current increases in the emitter-collector circuit in response to an input current between base and emitter, the point 15 rises and disables the clamping diode 13. Conversely, a reduction in base-emitter input current causes a drop in emitter-collector current and the consequent drop in point 15, activating the clamping action. In the circuit shown in FIG. 1, a negative pulse at input terminal 16 is contemplated for initiating operation of the circuit. When the initiating pulse arrives, point 15 goes sharply positive and the short-circuiting action of the clamp is removed and condenser 10 is free to charge.

The charging circuit connected to terminal 12 of condenser 10 is a constant current source, with an actual or apparent high impedance, the particular current source shown comprising the high gain transistor 20, of the N-P-N type, with the emitter follower resistor 21, and with a positive potential on the collector. The emitter end of the resistor 21 is coupled through the diode 22, of the Zener type, to the base of transistor 20 through resistance 23. Transistor 20 with the feedback circuit shown constitutes a boot strap sweep generator whose sweep rate is determined almost entirely by the RC time constant of 23—10, since the effect of the Zener diode 22 is to produce approximately unity gain between the emitter of emitter follower 21 and the top of resistor 23. With such a feedback circuit, the two ends of resistor 23 rise uniformly and together to produce a substantially linear increase in potential at point 12. However, point 12 can easily be held by clamping action at or near ground potential. According to another important feature of this invention, point 12 is held at or near ground potential by the clamping action of clamping diode 13, and point 12 can commence its linear rise only when this clamp is removed.

The level to which condenser 10 may be charged and the length of the voltage ramp produced by the constant-current boot strap circuit is, according to this invention, controlled by an adjustable clamping circuit comprising the clamping diode 25 and adjustable potentiometer 24. In the example shown, the threshold of the clamping circuit is adjustable by the sliding contact of the potentiometer which is connected through diode 25 to the upper terminal 12 of condenser 10.

With the connections as shown, the terminals of the potentiometer 24 should be connected between ground and a positive potential, the value of the ground-to-positive potential being equal to or greater than the maximum potential to which condenser 10 may be expected or permitted to charge. When the anode potential of diode 25 rises to or slightly exceeds the threshold bias established on the cathode, the diode 25 momentarily conducts, preferably quite heavily, and momentarily interrupts the flow of charging current into the condenser 10.

When current momentarily ceases to flow through the condenser circuit, including the base and emitter of transistor 11, the collector potential of transistor 11 abruptly rises thus reducing the base-emitter current in transistor 17 causing a drop in emitter-collector current in 17 and the consequent drop in voltage at point 15, the reestablishment of the clamping action of 13, and the firm short-circuit of the condenser 10. A new initiating pulse is required at input terminal 16 to start a new cycle of linear charging and abrupt discharge.

An output circuit may be connected to any of several points in FIG. 1. Preferably, an output circuit is connected to the collector of transistor 11 at which point the voltage wave shape is rectangular, the horizontal dimensions of the rectangular wave being a function of the charging rate of condenser 10 and the adjusted ceiling potential of the bias voltage on the clamp 25. If desired, the trailing edge of the rectangular waveform may be differentiated as at 26 to produce a sharp output pulse marking the trailing edge of the rectangular pulse and occurring at a time interval after the initiating pulse manually controlled by potentiometer 24.

Figure 2:
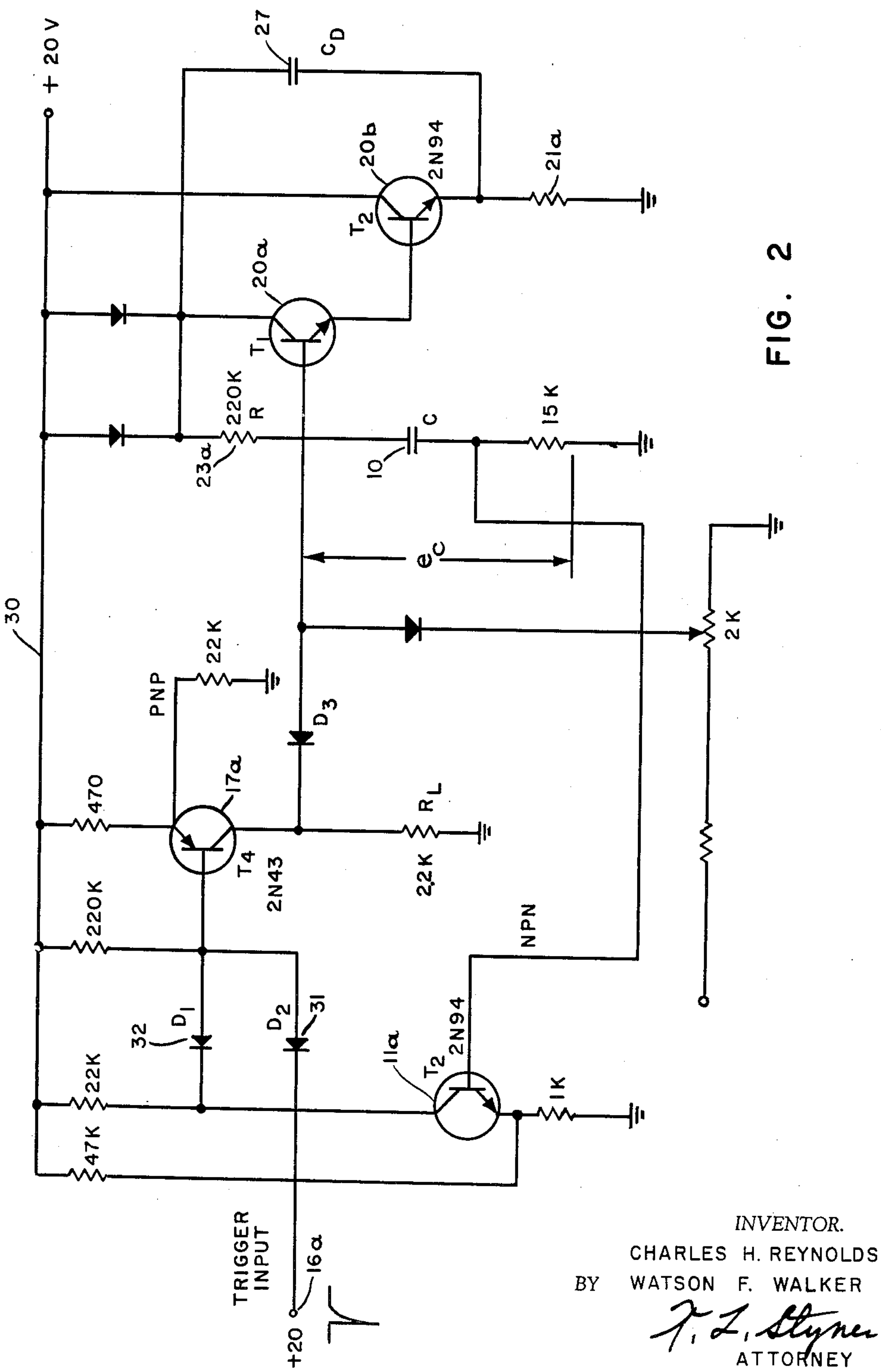
FIG. 2 is a circuit diagram, with complete operating details, of another embodiment of this invention; and, FIG. 3 is a circuit diagram of a preferred embodiment of this invention.

The circuit of FIG. 2 is somewhat refined but embodies the principles of the circuit of FIG. 1. For example, if the boot strap transistor 20 has insufficient gain, two transistors 20*a* and 20*b* may be employed, the emitter follower resistor 21*a* being coupled back to the collector of 20*a* and to the upper end of resistor 23*a* for boot strap operation. Instead of the Zener diode, the condenser 27, of relatively large capacity, may be used and the gain of the boot strap circuit adjusted to unity. If the transistors 20*a* and 20*b* and 11*a* are of the N-P-N type, transistor 17*a* should be of the P-N-P type so that one potential bus 30 may be employed to energize the entire circuit. The input trigger pulse from input terminal 16*a* is applied through diode 31 to the base of 17*a*, while the feedback information is applied to the base through diode 32. Transistors 20*a*, 20*b* and 11*a* may each be of the type commercially known as the 2N94 type obtainable from General Electric Company, Schenectady, New York, and the transistor 17*a* may be of the commercially available 2N32 type, obtainable from the same supplier. With component constants approximately of the value indicated on FIG. 2, accurate control of delay between input and output pulses from a few microseconds to several milliseconds, depending only upon the RC constant of 23*a* and 10, has been obtained.

Figure 3:
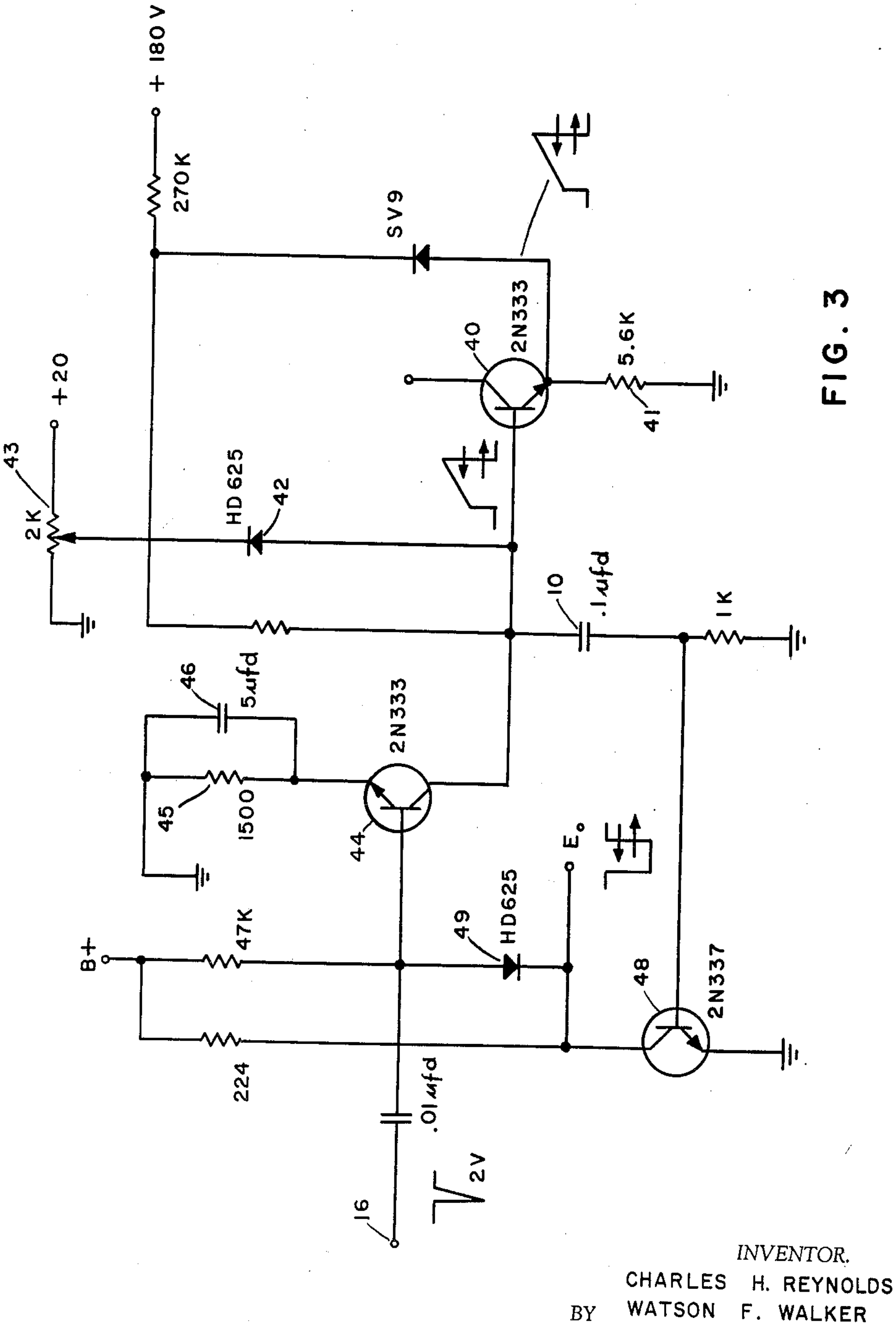

FIG. 3 shows another and a preferred embodiment of this invention where the boot strap circuit comprises the transistor 40 of the commercial type 2N333 with an emitter-resistor 41 of 5.6K ohms. The diode 42 in the bias adjusting circuit is of the commercial type HD625, while the potentiometer 43 is 2K ohms and is connected across 20 volts. The clamping action of diode 13 of FIG. 1 is incorporated in the transistor 44 which is of the 2N333 type with the emitter connected to ground through emitter-resistor 45 bypassed by the five microfarad condenser 46. Information concerning cessation of charging current in storage condenser 10 and in the emitter-base circuit of transistor 48 is fed back to the base of transistor 44 through the diode 49 which, preferably, is also of the HD625 type. When the condenser 10 voltage reaches the level of bias established by the potentiometer 43, the clamping action of diode 42 stops current flow into capacitor 10 and consequently into the base of 48, causing the base of 44 to swing sharply positive to discharge condenser 10. An output circuit may be taken from the collector of 48, as above, in which is found a rectangular waveform, the horizontal dimensions of which are linearly and accurately controlled by the adjustment of the potentiometer 43.

What is claimed is:

1. In combination in a variable delay circuit, a storage condenser, a transistor, two electrodes of said transistor being connected in series between a point of reference potential and one terminal of said condenser, a load resistor and a clamping diode connected in series between the other terminal of said condenser and said point, means connected to another electrode of said transistor and responsive to the voltage of said electrode for changing the current through said load resistor and changing the voltage on the side of said diode connected to said load resistor, means connected to said other terminal of said condenser for linearly charging said condenser when clamping is relieved, and adjustable clamping means connected to said other terminal of said condenser for adjusting the maximum charge voltage of said condenser.

2. A linear delay device comprising a storage condenser, a linear charging voltage means connected across said condenser, a discharging circuit connected across said condenser, said discharging circuit comprising a clamping diode and a resistor connected in series across said condenser, a transistor, two electrodes of said transistor being connected in series circuit with said condenser so that the potential of a third electrode of said transistor is a function of the current flowing into said condenser, an amplifier with a control electrode connected to said third electrode and responsive to said potential and with an output electrode connected to said resistor means for changing the current through said resistor and for changing the potential of the connected terminal of said diode, and means for selectively adjusting the potential of the other terminal of said diode to establish any predetermined voltage across said clamping diode.

3. A linear delay device comprising a storage condenser, a boot strap type linear charging circuit connected across said condenser, means for holding the voltage of the charging circuit at or near zero potential and for holding said condenser discharged, the last named means comprising an adjustable clamping diode-type circuit connected across said condenser, said clamping circuit including means coupled to said condenser and responsive to current flowing in said condenser for establishing a potential at one terminal of the diode portion of said clamping circuit, and an adjustable voltage source connected to the other terminal of said diode portion of said clamping circuit.

4. A linear delay device comprising a storage condenser, a linear voltage charging source across said condenser, a discharge diode clamping circuit connected across said condenser, an amplifier responsive to an initiating pulse and connected to said diode clamping circuit for applying a disabling voltage to one terminal of said diode clamping circuit to permit charging current to flow, means in circuit with said condenser for sampling said charging current and connected to one terminal of said diode clamping circuit for continuing the disabling voltage of said diode clamping circuit, and means for manually adjusting the potential of another terminal of said diode clamping circuit for predetermining the maximum voltage to which said storage condenser may charge.

5. A linear delay device comprising a storage condenser, a source of linear charging voltage connected across said storage condenser, a clamping circuit comprising a unidirectional conducting device connected across said condenser and so polarized with respect to said changing voltage as to normally hold said storage condenser in discharged condition, a regenerative amplifier having an output electrode and connected in circuit with said condenser and responsive to changes in current flowing into the condenser for changing the potential said output terminal, said output terminal being coupled to one terminal of said unidirectional device for normally disabling said clamping circuit, and means for adjusting the potential of another terminal of said unidirectional device for limiting the maximum condenser voltage to which said condenser may charge.

6. A linear delay device comprising a storage condenser, a linear voltage charging source connected across said condenser, a discharge clamping circuit comprising a first transistor with two electrodes connected across said condenser for normally holding said condenser discharged, an amplifier comprising a second transistor with two electrodes connected in series with said condenser, the potential of the third electrode of said second transistor being a function of the current flowing between the associated two electrodes, the third electrode of said first transistor being responsive to an initiating pulse for momentarily disabling said first transistor to permit charging current to flow; said third electrode of said second transistor being coupled to the third electrode of said first transistor for holding the clamping circuit of said first transistor in disabled condition when said charging current starts, and clamping means connected to said condenser for predetermining the maximum voltage to which said storage condenser may charge.

References Cited in the file of this patent

UNITED STATES PATENTS

| | | |
|---|---|---|
| 2,543,445 | Doolittle | Feb. 27, 1951 |
| 2,788,442 | Smith | Apr. 9, 1957 |
| 2,829,257 | Root | Apr. 1, 1958 |
| 2,837,663 | Walz | June 3, 1958 |
| 2,861,181 | Benton | Nov. 18, 1958 |
| 2,898,481 | Gahwiler | Aug. 4, 1959 |
| 2,916,705 | Stephenson | Dec. 8, 1959 |

UNITED STATES PATENT OFFICE

CERTIFICATE OF CORRECTION

Patent No. 3,035,184

May 15, 1962

Watson F. Walker et al.

It is hereby certified that error appears in the above numbered patent requiring correction and that the said Letters Patent should read as corrected below.

Column 4, line 38, strike out "means"; column 5, line 7, before "said", first occurrence, insert -- of --.

Signed and sealed this 30th day of October 1962.

(SEAL)
Attest:

ERNEST W. SWIDER
Attesting Officer

DAVID L. LADD
Commissioner of Patents